US005632154A

United States Patent [19]
Sibik et al.

[11] Patent Number: 5,632,154
[45] Date of Patent: May 27, 1997

[54] FEED FORWARD CONTROL OF EXPANSION VALVE

[75] Inventors: Lee L. Sibik, Onalaska; Daniel C. Leaver; Craig M. Goshaw, both of La Crosse, all of Wis.

[73] Assignee: American Standard Inc., Piscataway, N.J.

[21] Appl. No.: 396,305

[22] Filed: Feb. 28, 1995

[51] Int. Cl.⁶ .......................... F25B 41/00; G05B 13/02
[52] U.S. Cl. .................. 62/99; 62/210; 165/292; 364/165
[58] Field of Search .................. 236/78 D; 62/210, 62/223, 225, 211; 165/292; 364/165

[56]  References Cited

U.S. PATENT DOCUMENTS

| | | | |
|---|---|---|---|
| 2,534,455 | 12/1950 | Koontz | 62/211 X |
| 3,174,298 | 3/1965 | Kleiss | 62/211 |
| 3,250,084 | 5/1966 | Anderson | 62/210 X |
| 4,265,091 | 5/1981 | Kobayashi | 62/126 |
| 4,328,678 | 5/1982 | Kono et al. | 62/126 |
| 4,463,573 | 8/1984 | Zeno et al. | 62/157 |
| 4,498,310 | 2/1985 | Imanishi et al. | 62/211 |
| 4,502,833 | 3/1985 | Hibino et al. | 415/17 |
| 4,506,518 | 3/1985 | Yoshikawa et al. | 62/180 |
| 4,574,870 | 3/1986 | Weitman | 165/1 |
| 4,610,612 | 9/1986 | Kocher | 418/195 |
| 4,612,775 | 9/1986 | Branz et al. | 62/126 |
| 4,662,819 | 5/1987 | Lakowske et al. | 415/129 |
| 4,676,870 | 6/1987 | Stewart et al. | 159/17 |
| 4,689,967 | 9/1987 | Han et al. | 62/201 |
| 4,715,190 | 12/1987 | Han et al. | 62/201 |
| 4,730,995 | 3/1988 | Dewhirst | 418/1 |
| 4,762,469 | 8/1988 | Tischer | 417/279 |
| 4,780,061 | 10/1988 | Butterworth | 417/371 |
| 4,928,494 | 5/1990 | Glamm | 62/222 |
| 4,986,085 | 1/1991 | Tischer | 62/225 |
| 5,009,074 | 4/1991 | Goubeaux et al. | 62/115 |
| 5,011,112 | 4/1991 | Glamm | 251/129 |
| 5,027,608 | 7/1991 | Rentmeester et al. | 62/115 |
| 5,043,863 | 8/1991 | Bristol et al. | 364/165 |
| 5,058,031 | 10/1991 | Swanson et al. | 364/483 |
| 5,079,930 | 1/1992 | Beaverson et al. | 62/129 |
| 5,083,374 | 1/1992 | Tischer | 251/129 |
| 5,115,644 | 5/1992 | Alsenz | 62/181 |
| 5,138,846 | 8/1992 | Ogawa et al. | 62/148 |
| 5,156,013 | 10/1992 | Arima et al. | 62/148 |
| 5,201,648 | 4/1993 | Lakowske | 418/201 |
| 5,203,685 | 4/1993 | Andersen et al. | 418/1 |
| 5,211,026 | 5/1993 | Linnert | 62/175 |
| 5,241,833 | 9/1993 | Ohkoshi | 62/126 |
| 5,257,508 | 11/1993 | Powell et al. | 62/180 |
| 5,257,921 | 11/1993 | Clarke et al. | 418/201 |
| 5,329,462 | 7/1994 | Friday et al. | 62/210 X |

OTHER PUBLICATIONS

Instrumentation for Process Measurement and Control Anderson, 1974 pp. 110–119, 161–167.
Modern Dictionary of Electronics, GRAF, 1973 PACE 395 & 212.
"Modern Control Engineering", by Katsuhiko Ogata, 1970, pp. 520–523.
"Fuzzy Logic Control of a Heat Exchanger Process", by J. J. Ostergaard, 1977, pp. 285–320.
"An Annotated Bibliography of Fuzzy Control", by Richard M. Tong, 1985, pp. 249–269.
"Application of Fuzzy Control to a Heat Exchanger System", by N.K. Sinha and J.D. Wright, Dec. 1977, pp. 1424–1428.
An Abstract entitled "Fuzzy Control for the Precision Water Bath of the Heat Exchange Calorimeter", by Sh. Fujieda and S. Tanaka, Aug. 1992.

Primary Examiner—William E. Wayner
Attorney, Agent, or Firm—William J. Beres; William O'Driscoll; Peter D. Ferguson

[57] ABSTRACT

A method of controlling an expansion valve in a refrigeration system. The method comprises the steps of controlling the modulation of the expansion valve based upon a first feedback control criteria; and controlling the modulation of the expansion valve based upon a second feed forward control criteria.

24 Claims, 5 Drawing Sheets

| | 1ST. PREFERRED EMBODIMENT | 2ND. PREFERRED EMBODIMENT |
|---|---|---|
| CLOSED LOOP | DISCHARGE SUPERHEAT CONTROL | LIQUID LEVEL CONTROL |
| OPEN LOOP | DELTA T | UNLOADER POSITION |

FEED FORWARD CONTROL OF EXPANSION VALVE

BACKGROUND OF THE INVENTION

The present invention is directed to a feed forward control for the expansion valve of a heating, ventilating, air conditioning or refrigeration (HVAC/R) system. In the preferred embodiment of the invention as described herein, the HVAC/R system is a water chiller system. Although discussed in terms of water chillers, the invention is applicable to all HVAC and refrigeration systems having system disturbances which can be anticipated. Such system disturbances include compressor staging, changes in compressor capacity such as those caused by loading or unloading, physical changes regarding the various cooling media used by the system such as changes in evaporator or condenser water temperature, changes in condenser cooling capacity such as those caused by fan staging, changes in evaporator heat exchanger capacity, changes in setpoint, changes in cooling tower capacity, and changes resulting from building load variations.

In water chiller systems, water is chilled in an evaporator so as to provide a cooling medium for air conditioning use elsewhere. Water is cheap, safe and can easily be transported by piping to an air handler by a first water loop. The air handler exchanges heat between air and water so as to condition the air for use in a zone or building.

The evaporator in a water chiller system is controlling the temperature of the water by heat exchange with refrigerant. The refrigerant circulates throughout the chiller system by means of a refrigerant loop. In the refrigerant loop, the refrigerant leaves the evaporator and enters a compressor where the pressure of the refrigerant is increased so as to change its condensation point. The compressed refrigerant leaves the compressor and enters a condenser where it is condensed from a vapor to a liquid refrigerant by heat exchange with a cooling medium, typically a second water system. The liquid refrigerant is then returned, by means of an expansion device, to the evaporator to continue the cycle through the chiller system. Aspects of typical chiller systems are shown in U.S. Pat. No. 4,780,061 to Butterworth; U.S. Pat. No. 4,762,409 to Tischer; U.S. Pat. No. 4,730,995 to Dewhirst; U.S. Pat. No. 4,662,190 to Tischer and U.S. Pat. No. 5,201,648 to Lakowske. All of these patents are assigned to the assignee of the present invention and all of these patents are incorporated herein by reference.

The expansion device in the chiller system is an electronic expansion valve which modulates refrigerant flow through the expansion valve in response to refrigerant superheat as measured after the refrigerant leaves the compressor. Typical electronic expansion valves are shown in U.S. Pat. No. 5,083,745 to Tischer; U.S. Pat. No. 4,986,085 to Tischer; U.S. Pat. No. 4,928,494 to Glamm and U.S. Pat. No. 5,011,112 to Glamm. These patents are assigned to the assignee of the present invention and are hereby incorporated by reference.

Typically, the compressor capacity is modulated in response to the leaving water temperature of the evaporator. Various methods of compressor capacity control and chiller capacity control are shown in U.S. Pat. No. 5,027,608 to Rentmeester et al.; U.S. Pat. No. 5,203,685 to Anderson et al.; U.S. Pat. No. 5,211,026 to Linnert; U.S. Pat. No. 4,715,190 to Han et al. and U.S. Pat. No. 4,689,967 to Han et al. Each of these patents is assigned to the assignee of the present invention and is hereby incorporated by reference.

While these various methods of controlling the expansion device and compressor capacities provide efficient and economical controls, better controls are both possible and desirable. More specifically, conventional control of the expansion valve is accomplished by feeding back a signal representing the result of the expansion valve's actions, that result typically being measured superheat. Such a control strategy, while effective, is reactionary as opposed to anticipatory. Thus, the expansion valve is constantly reacting to system disturbances such as changes in compressor capacity.

SUMMARY OF THE INVENTION

It is the principle object of the present invention to provide better controls for HVAC and refrigeration systems such as water chiller systems.

It is an object, feature and advantage of the present invention to link the control of an expansion valve directly to system disturbances such as, for example, changes in load, changes in compressor capacity, or changes in the temperatures of the various heat exchange fluids used in the system.

It is an object, feature and advantage of the present invention to provide a feed forward control which, during normal capacity control, allows the expansion valve to be positioned in response to compressor capacity changes so as to anticipate the system disturbances.

It is an object, feature and advantage of the present invention to provide an expansion valve which responds directly to changes in compressor capacity.

It is an object of the present invention to provide an expansion valve which responds directly to changes in the temperature of the water entering the evaporator.

It is an object of the present invention to provide an expansion valve which responds directly to changes in the differential between the temperature of the water entering the evaporator and the temperature of the water leaving the evaporator.

It is an object, feature and advantage of the present invention to provide closed loop control of an expansion valve based upon a first criteria and open loop control of the expansion valve based upon a second criteria.

It is a further object of the present invention that the first criteria be discharge superheat and that the second criteria be either evaporator entering water temperature or the difference between evaporator entering water temperature and evaporator leaving water temperature.

It is another object of the present invention that the first criteria be a measure of refrigerant liquid level in the evaporator and that the second criteria be a measure of compressor capacity.

It is an object, feature and advantage of the present invention to use a feed forward control signal from the compressor unloader to reposition the expansion valve instantaneously as system disturbances occur thereby reducing swings in either discharge superheat or refrigerant liquid level.

It is an object, feature and advantage of the present invention to determine and control the position of an electronic expansion valve as a function of a signal or signals indicative of unloader position, saturated evaporator temperature, and saturated condensing temperature.

It is a further object of the present invention to reposition the expansion valve instantaneously upon the occurrence of an unloader position change or a change in the saturated operating temperatures.

It is a further object of the present invention to control the evaporator liquid level by making adjustments in expansion valve position if the liquid level drifts upwardly or downwardly.

It is a further object of the present invention to control discharge superheat by adjustments to the expansion valve position if the discharge superheat drifts upwardly or downwardly.

It is a further object of the present invention to reposition the expansion valve based on changes in motor current.

It is an object, feature and advantage of the present invention to provide an expansion valve which will open to the calculated compressor pumping rate based upon the pressure differences across the expansion valve and the refrigerant density.

The present invention provides a method of controlling an expansion valve in a refrigeration system. The method comprises the steps of controlling the modulation of the expansion valve based upon a first feedback control criteria; and controlling the modulation of the expansion valve based upon a second feedforward control criteria.

The present invention also provides a method of controlling the flow of refrigerant in a refrigeration system including an expansion device and a compression device. The method comprises the steps of measuring the pumping capacity or CFM displacement capacity of the compression device; and modulating the expansion device to match the measured compressor capacity.

The present invention further provides a method of controlling an expansion valve comprising the steps of: (a) constantly controlling an expansion valve based upon a first measured criteria; (b) determining a disturbance, in a second measured criteria, in the system being controlled by the expansion valve; (c) providing a feed forward control signal to the expansion valve based upon the second criteria; and (d) controlling the expansion valve based upon the second criteria.

The present invention still further provides a method of controlling an expansion valve in a refrigeration or HVAC system comprising the steps of: providing closed loop control of an expansion valve based upon a first criteria; and providing open loop control of the expansion valve based upon at least a second criteria differing from the first criteria.

The present invention additionally provides a method of controlling the capacity of a chiller system where the chiller system includes a circularly linked compressor, condenser, expansion device, and an evaporator. In the system, the evaporator receives entering water having an entering water temperature and provides leaving water having a leaving water temperature and where the compressor compresses refrigerant having a measured superheat. The method comprising the steps of: measuring the leaving water temperature and the refrigerant superheat; determining a leaving water temperature error as a function of the difference between the leaving water temperature and a setpoint; providing a first mode of capacity control wherein the expansion valve is modulated in response to the measured superheat; and providing a second mode of capacity control where the expansion valve is modulated in response to the leaving water temperature error or a change in compressor capacity.

The present invention yet further provides a method of repositioning an expansion valve in a chiller system in response to changes in system capacity. The chiller system has an evaporator for conditioning entering water and providing leaving water. The method comprising the steps of: monitoring the entering water temperature of the evaporator; monitoring the leaving water temperature of the evaporator; determining a water temperature difference between the entering water temperature and the leaving water temperature; determining a temperature differential setpoint; comparing the water temperature difference to the differential temperature setpoint to establish an error; and repositioning the expansion valve to minimize the error.

The present invention additionally provides a water chiller system comprising an evaporator for chilling a fluid; and a compressor, receiving heated refrigerant from the evaporator, for changing the condensation temperature of the refrigerant by compression. The system also includes a condenser, receiving compressed refrigerant from the compressor, for condensing the compressed refrigerant; an expansion device, receiving condensed refrigerant from a condenser, for controllably returning the condensed refrigerant to the evaporator; and a controller, operatively connected to the expansion device, for controlling the operation of the expansion device. The system further includes a feed forward control, coupled to the controller, for anticipating changes in the load of the evaporator whereby the feed forward control includes a first sensor sensing a first value and controlling the operation of the expansion valve in response to the sensed first value.

DETAILED DESCRIPTION OF THE DRAWINGS

Figure 1:
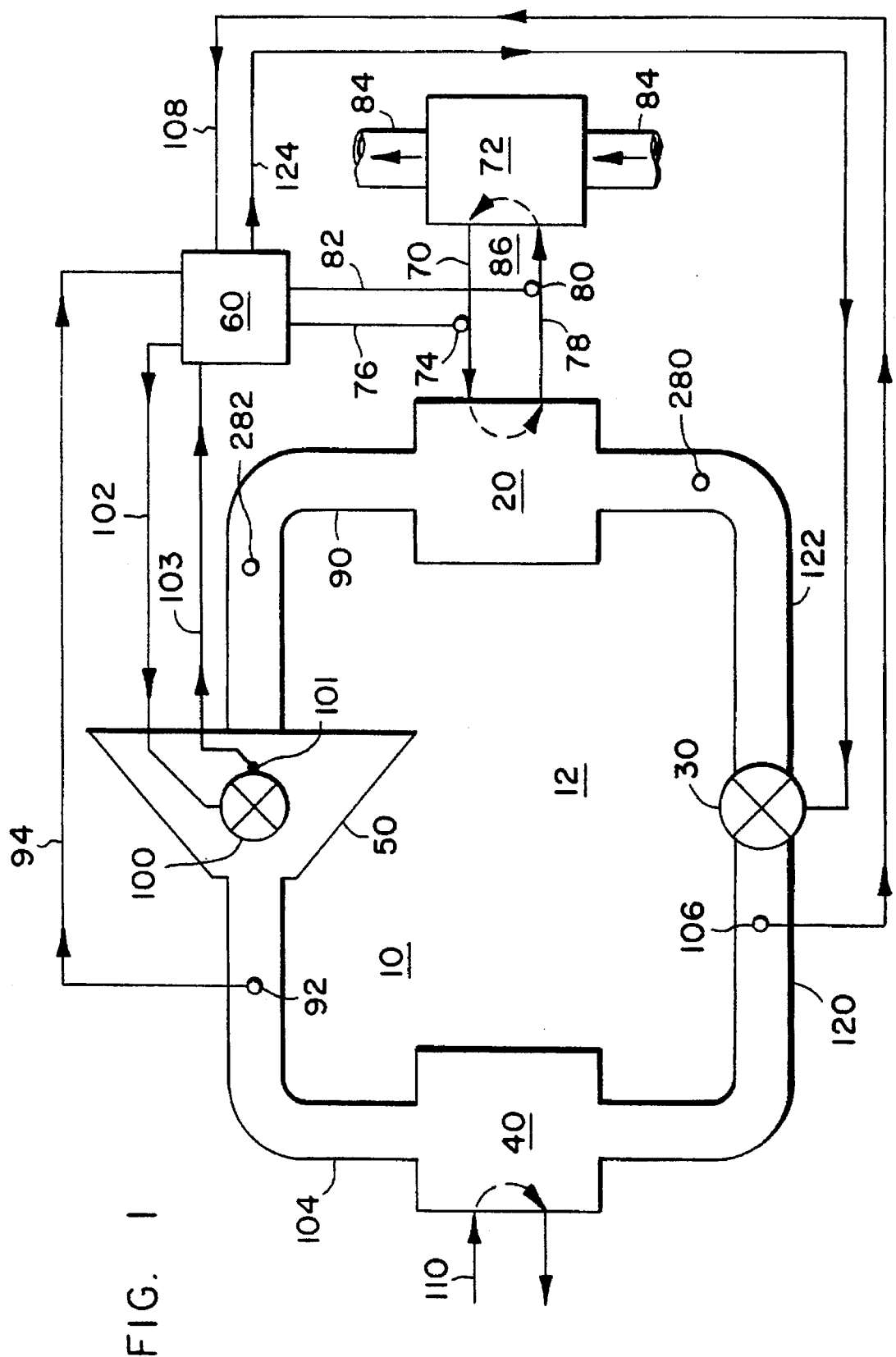
FIG. 1 is a diagram showing a water chiller system to which the feed forward concept of the present invention applies.

FIG. 1 shows a typical chiller system 10 which uses refrigerant to provide chilled water for air conditioning purposes. The chiller system 10 has a refrigerant loop 12 including an evaporator 20, an expansion device such as an expansion valve 30, a condenser 40 and a compressor 50. The entire system is controlled by an electronic controller 60.

The evaporator 20 can be a flooded evaporator, a direct expansion evaporator, a spray tree evaporator, a falling film evaporator or the like. The evaporator 20 uses refrigerant provided to it by the expansion valve 30 to condition water. The entering water is provided by a conduit 70 from an air handler 72 and is measured by an entering water temperature sensor 74. An electrical connection 76 provides the measured entering water temperature (EWT) to the controller 60. After the entering water has undergone heat exchange in the evaporator 20, it is returned to the air handler 72 by means of a conduit 78. The water leaving the evaporator 20 is commonly known as leaving water. The leaving water temperature (LWT) is measured by a leaving water temperature sensor 80 and provided to the controller 60 by means of an electrical connection 82. The conditioned leaving water is placed in heat exchange relationship in the air handler 72 with air that is then provided to zones or buildings for air conditioning purposes by means of ducts 84. The air handler 72, the conduits 70, 78 and the evaporator 20 form a first water loop 86.

Figure 7:
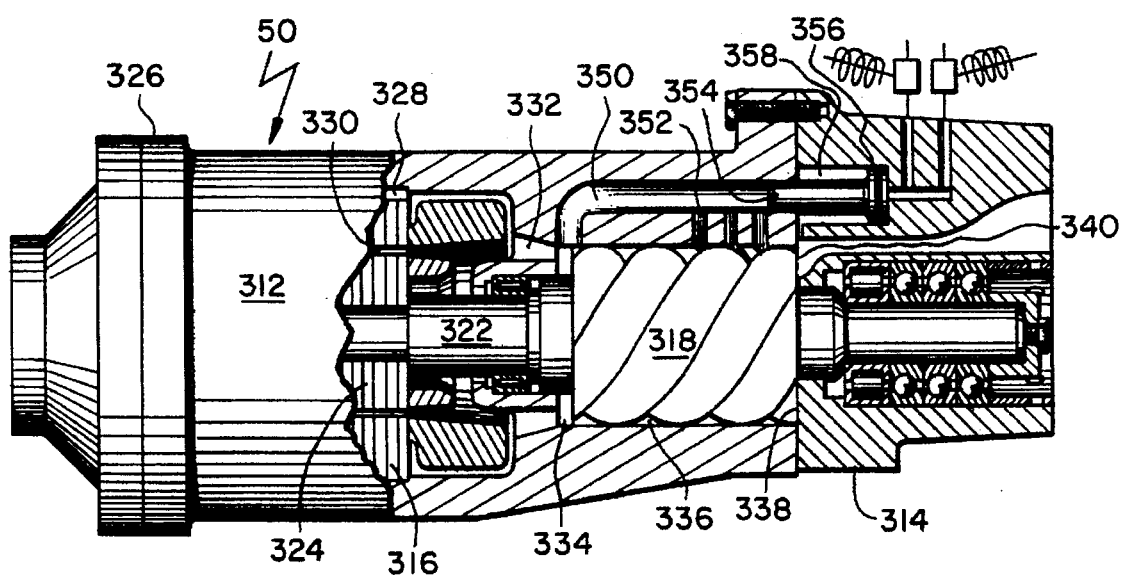
FIG. 7 illustrates the unloader arrangement for a screw compressor.

The refrigerant in the evaporator 20 has been vaporized by the heat exchange with the first water loop 86. As part of the refrigerant loop 12, the vaporous refrigerant leaves the evaporator 20 and is directed to the compressor 50 by a passage 90. In the compressor 50 the refrigerant is compressed. The compressor's capacity, typically measured as pumping capacity in CFM, is modulated by a flow control device such as the piston unloader arrangement shown in U.S. Pat. No. 5,203,685 (previously incorporated by reference). Such an unloader arrangement is designated by the reference numeral 100 and can be controlled by the system controller 60 using an electrical connection 102 and solenoid valves (not shown) or the like as described in U.S. Pat. No. 5,203,685. The unloader position is or can be directly controlled by a direct positioning device such as a stepper motor or is measured by a position sensor 101 and reported to the controller 60 by an electrical connector 103. Exemplary sensors 101 are shown in U.S. Pat. No. 5,257, 921 to Clark et al. and U.S. Pat. No. 4,610,612 to Kocher, each of which are incorporated herein. Details of the unloader are shown in FIG. 7.

The compressed refrigerant leaves the compressor 50 and is directed by a passage 104 to the condenser 40. The refrigerant superheat is measured as the differential between refrigerant temperature as measured by the sensor 92 and refrigerant temperature as measured by a sensor 106 (other measures of superheat are defined subsequently). Those signals are respectively provided to the controller 60 by electrical connections 94 and 108.

In the condenser 40, a cooling medium such as a second water loop 110 condenses the compressed vaporous refrigerant to a liquid. The condensed liquid refrigerant is then returned to the evaporator 20 by means of a passage 120, the expansion valve 30 and a passage 122. The expansion valve 30 is described in the patents previously incorporated herein. Effectively, the refrigerant loop 12 comprises the evaporator 20, the passage 90, the compressor 50, the passage 104, the condenser 40, the passage 120, the expansion valve 30 and the passage 122.

Conventionally, the measured superheat is used to modulate the amount of refrigerant passing through the expansion valve 30. In the present invention, the controller 60 provides such control of the expansion valve 30 by means of an electrical connection 124.

The invention involves controlling the position of the expansion valve 30 during the normal capacity control of the compressor 50. Conventionally, a closed loop, feedback control is operated whereby the expansion valve 30 does not adjust to changes in compressor capacity until the superheat as measured by the sensor 92, 106 is affected. This is a feedback control since it typically occurs some minutes after an actual change in compressor capacity.

The present invention proposes to use a feed forward signal to position the expansion valve 30 at the time of compressor capacity changes, in anticipation of superheat changes a feed forward signal controls undesirable effects of measurable system disturbances by appropriately compensating for these system disturbances before they materialize. In a first preferred embodiment, the present invention uses the evaporator water temperature differential (Delta T) between the entering water temperature EWT as measured by the sensor 74 and the leaving water temperature LWT as measured by the sensor 80 as a feed forward signal to reposition the expansion valve 30 as the position of the unloader 100 changes. This indirect measurement of compressor capacity as provided by the evaporator water temperature differential can be used to reposition the expansion valve 30 based on the change in load evidenced by the water temperature differential. Secondary variations in system disturbance such as changes in saturated evaporator temperature or pressure, or saturated condensing temperature or pressure, will occur when the primary system disturbance occurs. In this case the primary system disturbance is a change in compressor capacity. The effects of these secondary variations can be used in the calculation of the feedforward signal to the expansion valve 30.

Effectively, as long as the evaporator water temperature differential is fairly constant, the expansion valve 30 is controlled conventionally in response to discharge superheat as measured by the sensor 92, 106. However, should the evaporator water temperature differential vary, the expansion valve 30 is repositioned based upon the anticipated direction and amount of change of the evaporator water temperature differential. This provides a feed forward control signal to the expansion valve 30 simultaneously with the change in compressor capacity. As is discussed subsequently in connection with FIG. 5, the conventional control of the expansion valve 30 occurs concurrently with the feed forward control.

Figure 2:
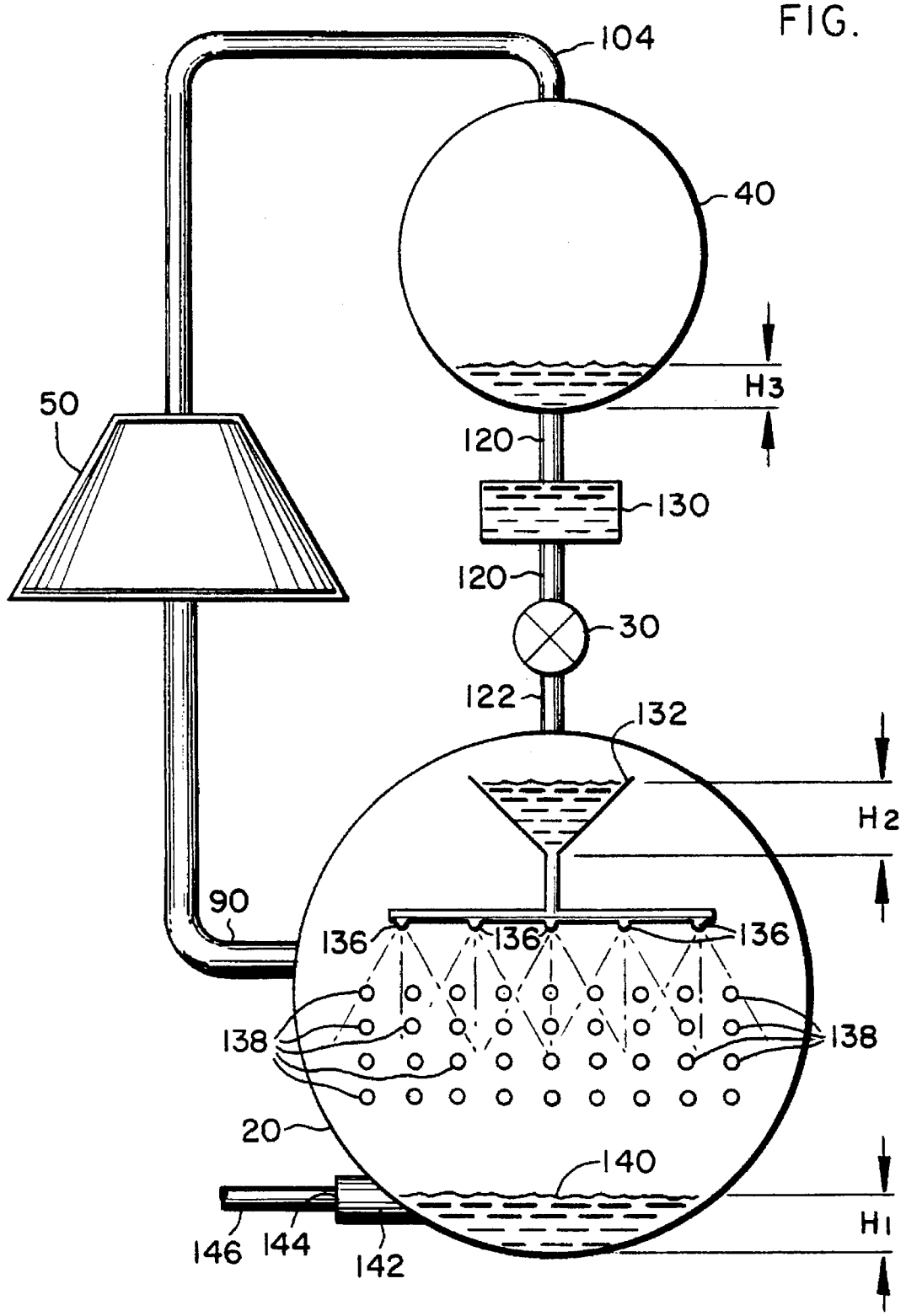
FIG. 2 is an alternative embodiment including a spray tree evaporator wherein the expansion valve responds to changes in compressor capacity thereby minimizing disturbances in liquid levels.

FIG. 2 shows a particular arrangement of the condenser 40, the expansion valve 30 and the evaporator 20. This is a second preferred embodiment of the present invention which is preferred when it is desirable to minimize the amount of refrigerant charge in the refrigerant loop 12. In this second preferred embodiment similar reference numbers are used where possible.

The second preferred embodiment of FIG. 2 includes a receiver or subcooler 130 located in the passage 120 and intended for receiving and accumulating, or subcooling, liquid refrigerant from the condenser 40. The expansion valve 30 controls the flow of refrigerant from the condenser 40 and liquid receiver 130 to the evaporator 20.

Rather than the flooded evaporator 20 used in the first preferred embodiment, the evaporator 20 of FIG. 2 is a sprayed bundle evaporator wherein liquid refrigerant accumulates in a liquid/vapor separator 132 and where the liquid refrigerant is manifolded through tubing 134 to a series of spray tubes 136. The spray tubes 136 spray refrigerant over the tubing 138 carrying the water in the first water loop 86. The sprayed refrigerant contacts the water tubes 138, absorbs heat therefrom and exits the evaporator via passage 90 to the compressor 50. Liquid refrigerant accumulates in a lower area 140 of the evaporator 20 where the depth height H1 of the refrigerant is measured conventionally, such as by a sensor 144 connected to the controller 60 by an electrical connection 146. If desired, the height H2 of the liquid in the liquid/vapor separator 132 can be similarly measured, as can the height H3 of the liquid refrigerant in the condenser 40.

The second preferred embodiment of FIG. 2 modulates the expansion valve 30 in response to the unloader position 100 on the theory, supported by laboratory data, that the expansion valve's position tracks the unloader's position. Thus this embodiment contemplates feed forward modulation of the expansion valve 30 in response to changes in the position 100 and feedback modulation of the position of the expansion valve 30 in response to one of the liquid levels H1, H2 or H3 (preferably H1) instead of modulating the expansion valve 30 in response to measured superheat as would be done in a previous system.

More specifically, feed forward modulation of the expansion valve 30 is accomplished in response to changes in the position of the unloader 100 as commanded by the controller 60, and feedback modulation of the expansion valve 30 is accomplished in response to the height H1 of the liquid refrigerant in the bottom 140 of the evaporator 20 as reported to the controller 60 by the sensor 144. In feedback modulation, the expansion valve 30 is incrementally opened in response to a decrease in the height H1 of the liquid refrigerant in the bottom 140 of the evaporator 20, and is incrementally closed in response to an increase in the height H1 of the liquid refrigerant accumulated in the bottom 140 of the evaporator 20.

In alternative embodiments of the second preferred embodiment shown in FIG. 2, it is contemplated that the position of the expansion valve could be modulated in response to the height H2 of the liquid refrigerant in the liquid/vapor separator 132 or in response to the height H3 of the refrigerant in the condenser 40.

Figures 3, 4:
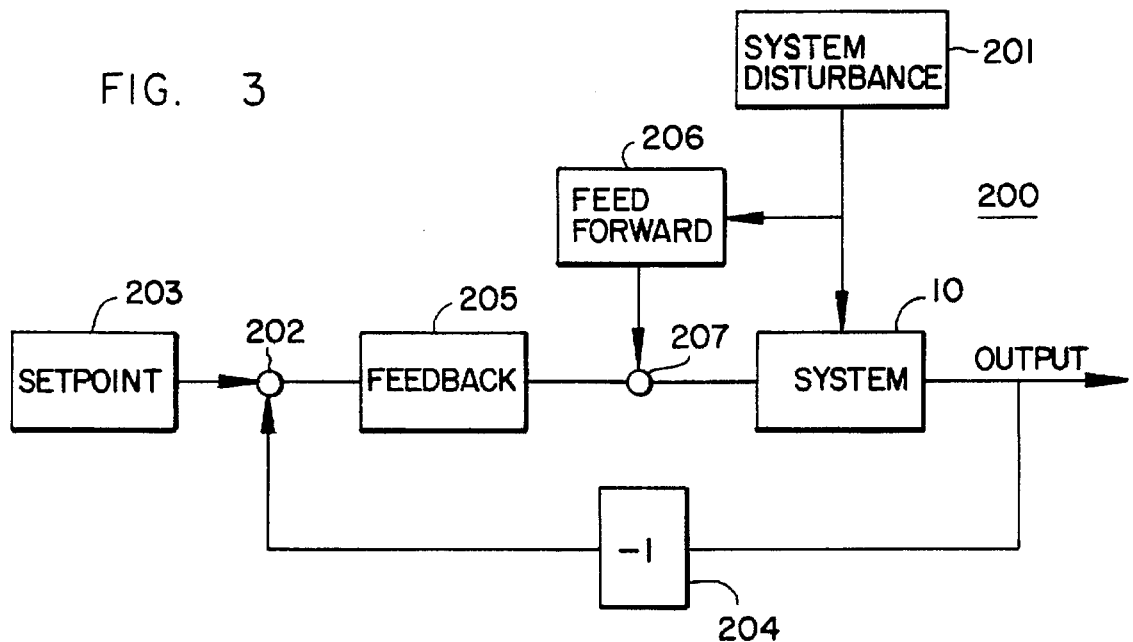
FIG. 3 is a control block diagram of the operation of the present invention.
FIG. 4 is a table showing the first and second preferred embodiments and the controls used during steady state conditions and system disturbance conditions.

FIG. 3 is a block diagram showing an overview of the control of the present invention operating with conventional control strategy in the controller 60. The block diagram 200 is initiated on a regular basis or alternatively upon the occurrence of any one of a number of predetermined events. Such predetermined events include any change in the position of the unloader 100, any variation in entering water temperature or leaving water temperature, or any variation in one of the liquid refrigerant heights H1, H2 or H3.

At step 201 a determination is made as to whether an system disturbance has occurred or is occurring. A system disturbance is a change in a variable, other than the variable used for feedback expansion valve control, where that change will alter the operating conditions of the system. Such system disturbances be indicated by a change in compressor capacity: as measured by the movement of the unloader 100, or as measured by the difference between entering water temperature and leaving water temperature. Other system disturbances include changes in condenser cooling capacity caused by fan staging, changes in setpoint, changes in cooling tower capacity, building load variations or changes in motor current. U.S. Pat. No. 5,058,031 to Swanson et al. is exemplary of measuring motor current. This patent is assigned to the assignee of the present invention and is hereby incorporated by reference.

System disturbances are directed to a feed forward control 206. The feed forward control 206 is designed to cancel the effect of a system disturbance. The expansion valve 30 is positioned by feed forward control based on prior knowledge of the causal effect of the disturbance on the system. In the first and second embodiment of this invention, the disturbance causes a change in mass flow through the compressor 50. To cancel the effect on the evaporator 20, the feed forward control 206 positions the expansion valve 30 to maintain mass balance in the evaporator 20.

If there is no system disturbance, conventional feedback expansion valve control 205 continues at step 202 by comparing a setpoint 203 with a conventional feedback signal 204 such as measured superheat. The control error is determined at block 202 and processed by the feedback control algorithm 205 to control the expansion valve 30. Feedback expansion valve control 205 typically modulates the position of the expansion valve 30 based on measured superheat but can alternatively modulate based upon liquid level as described herein.

If a system disturbance was determined at step 201, the feed forward control 206 of the present invention is implemented. Instead of minimizing an error signal with regard to measured superheat or liquid level, the feed forward control 206 will attempt to minimize an error signal reflective of the system disturbance. For example, if the difference between entering water temperature and leaving water temperature varies from a predetermined constant by an amount sufficient to be considered an error, the expansion valve 30 will immediately be adjusted to reduce that error. In a second example, any change in unloader position 100 will result in an immediate and corresponding change in expansion valve position.

Feedback control 205 runs concurrently with feed forward control 206. Feedback control 205 reacts to disturbances in a predetermined variable such as superheat, as well as to setpoint changes 203 and modeling errors in feed forward control 206. If the difference between the feedback signal 204 and the setpoint 203 is an amount sufficient to be considered an error, feedback control 205 will generate an appropriate command signal to the expansion valve 30 to minimize the error. The feed forward signal 206 and the feedback signal 205 are summed at 207 and used to control the system 10.

FIG. 4 is a table showing the different control strategies for closed loop control as opposed to open loop control as applied to the first and second preferred embodiments an open loop control, unlike a closed loop control, is a feed through path having no feedback around it and therefore, is not self regulating. Feed forward controls are a type of open loop control.

In the first preferred embodiment, closed loop control of the expansion valve is a feedback control based upon discharge superheat. In the event of a system disturbance in the first preferred embodiment, a feed forward control strategy based on Delta T, the difference between entering water temperature and leaving water temperature, is implemented. Both control strategies operate concurrently, however the feed forward control strategy acts as an open loop control while the feedback control acts as a closed loop control.

Figure 5:
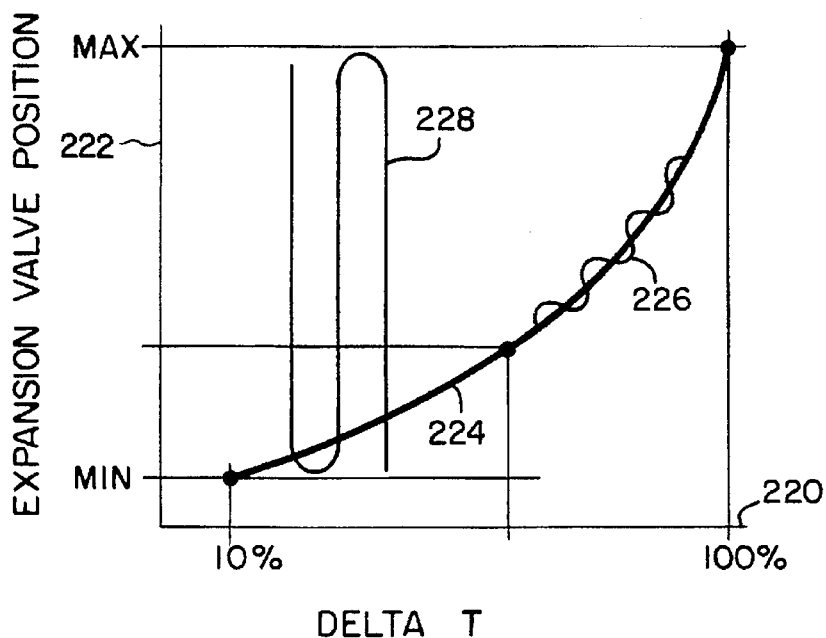
FIG. 5 is a graph of the first preferred embodiment.

FIG. 5 is a graph demonstrating the two control strategies of the first preferred embodiment. Delta T, the difference between entering water temperature and leaving water temperature, is shown as a percentage of capacity on the ordinate 220, while expansion valve position is shown on the abscissa 222 as varying between minimum and maximum positions.

$$\text{capacity} = MC_p \text{ (Delta T)}$$

where the M is the mass flow rate through the evaporator loop and where $C_p$ is the specific heat of water. $C_p$ is a constant for a given chiller, and M is typically assumed to be 2.4 gallons per minute per ton of mass flow. A Delta T of 10° F. is conventionally established as full capacity (i.e. 100%). This approach allows the control algorithm to be generally applicable to any chiller once the appropriate $C_p$ and M are determined. Thus, effectively, the percentage capacity shown on the ordinate of FIG. 5 is determined by $$\text{capacity} = (\text{Delta } T)/(\text{maximum Delta } T) \times 100\%.$$

The curve 224 shows the feed forward control where any changes in Delta T result in an instantaneous and corresponding change in expansion valve position along the curve 224. The sign wave 226 superimposed on the curve 224 illustrates how the discharge superheat control continues to modulate expansion valve position about the curve 224 even as the feed forward control based on Delta T operates. One of the advantages of the first preferred embodiment is in reducing wide swings in expansion valve position which occur in prior art controls. Such wide swings are illustrated by line 228 as causing the expansion valve 30 to vary across its maximum and minimum positions in response to system disturbances. Such wildly varying swings are eliminated by the present invention.

Referring again to FIG. 4, the second preferred embodiment has a liquid level control based upon a liquid level in the evaporator as determined by the measurement H1 or alternatively by measurement of H2 or H3. When the second preferred embodiment detects a system disturbance, such as by an unloader position change, an immediate and corresponding change is made in the position of the expansion valve 30.

Figure 6:
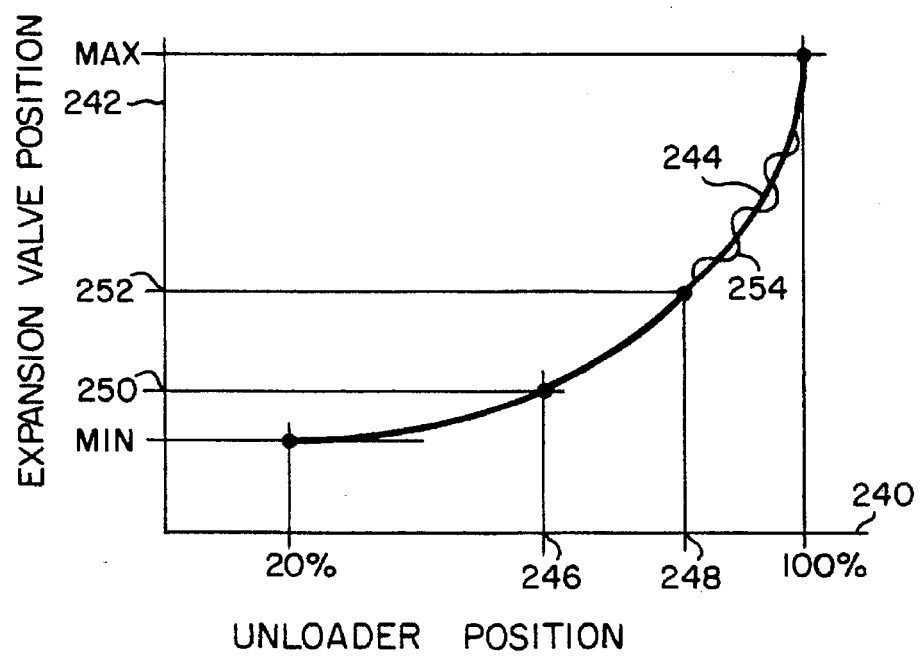
FIG. 6 is a graph of the second preferred embodiment.

This is illustrated in FIG. 6 where unloader position is shown on the ordinate 240 and expansion valve (EXV) position is shown on the abscissa 242. The feed forward control in response to system disturbance is shown by the curve 244. Any change in capacity made by the unloader 100, such as an increase in capacity from point 246 to point 248, is echoed immediately by a respective change in the expansion valve position from point 250 to point 252. While the broad changes in expansion valve position are accomplished along the curve 244, the liquid level control strategy continues to modulate the position of the expansion valve 30 as is illustrated by the sign wave 254 superimposed upon the curve 244.

A third alternative embodiment of this anticipatory feed forward control involves the comparison of the entering water temperature (EWT) as measured by the sensor 74 directly to the chilled water setpoint. Any water temperature changes detected will reflect load changes in the evaporator water loop 86. The expansion valve 30 is then controlled in response to that detected change in load to anticipate the changes in system capacity. Such system disturbance can be indicated by a change in compressor capacity as measured by the difference between entering water temperature and a setpoint. In the third embodiment, the system disturbance is a required change in system cooling capacity below the minimum capacity obtained with the unloader 100 fully unloaded. To cancel out the effect of the required load change, the feed forward control 206 positions the expansion valve 30 to allow refrigerant vapor to bleed out of the condenser 40 inversely proportional to the required load. If the entering water temperature differs from a setpoint by more than a predetermined amount so as to be considered an error, the expansion valve 30 will immediately be adjusted to reduce the error from that setpoint. Details of modulating an expansion valve while an unloader is fully unloaded are described in applicants patent application U.S. Ser. No. 08/234,091 filed on Apr. 28, 1994 for "Evaporator Water Temperature Control for a Chiller System" by Lee L. Sibik, Daniel C. Leaver and Paul R. Glamm now U.S. Pat. No. 5,419,146, issued on May 30, 1995. This application is assigned to the assignee of the present invention and is incorporated herein by reference.

FIG. 7 is a partial cross-sectional side view of a screw compressor illustrating piston unloader apparatus associated with the male rotor of a screw compressor with the unloader piston in the full unload position. Compressor 50 is comprised of a rotor housing 312 and bearing housing 314. A motor 316, male rotor 318 and female rotor (not shown) are disposed in the rotor housing. Shaft 322 extends from the male rotor and motor rotor 324 is mounted thereon.

Suction gas enters rotor housing 312 through the suction end 326 of the compressor and passes through a suction strainer (not shown) prior to passing through and around motor 316 in a manner which cools the motor. In this regard, suction gas passing through and around motor 316 passes out of motor-rotor housing gap 328, rotor-stator gap 330 and into suction area 332 within the rotor housing. The gas next passes from suction area 332, through suction port 334 and into the working chamber 336 where it is enveloped in a chevron shaped compression pocket defined by the wall of the working chamber and the intermeshed lobes of male rotor 318 and the female rotor.

As the male and female rotors rotate, the pocket in which the suction gas is initially enveloped is closed off from suction port 334 and is circumferentially displaced toward high pressure end wall 338 of the compressors working chamber. As such displacement occurs, the volume of the pocket is reduced and the gas contained therein is compressed until such time as the pocket opens to discharge port 340.

Rotor housing 312 defines a cylindrical bore 350 which is in flow communication with suction port 334 or some other area of the compressor or system in which the compressor is employed which is at suction pressure. Rotor housing 312 also defines a series of ports 352 which communicate between bore 350 and working chamber 336. Disposed in bore 350 is an unloader piston 354 which includes a control portion 356 disposed in a chamber 358 defined by the bearing housing. Unloader piston 354 is axially positionable within bore 350 so as to provide for the selective occlusion of ports 352.

From the foregoing, it is apparent that the present invention provides feed forward controls for water chiller systems. It should be recognized that the invention applies to other refrigeration, HVAC, and chiller systems and that modifications are also contemplated to fall within the spirit and scope of the claims. Such modifications include the replacement of the screw compressor described herein with a variable capacity centrifugal compressor, a variable speed scroll compressor, a variable speed reciprocating compressor or the like. For example, the application of the present invention to a centrifugal chiller could use either entering water temperature or Delta T as a closed loop, feedback control criteria and could use either compressor speed or inlet guide vane position as an open loop, feed forward control criteria. Other modifications including the replacement of the flooded type evaporator described herein with other conventional evaporators including direct expansion evaporators. Additionally, other feed forward signals are contemplated such as the staging of fans in an air cooled condenser. Such staging is described in U.S. Pat. No. 5,138,844 to Clanin et al. That patent being commonly assigned with the present invention and incorporated by reference. It should also be recognized that the feed forward control of the expansion valve described herein is generally expected to operate concurrently with the conventional PID expansion valve controls presently used. Thus, for example, the expansion valve will modulate the flow of refrigerant based on measured superheat even while the movement of the unloader generates a feed forward signal anticipating a significant change in system capacity.

Finally, although superheat has been described as the differential between refrigerant temperature as measured by the sensor 92 and the refrigerant temperature as measured by the sensor 106, a person of skill in the art will recognize that there are alternative definitions of superheat in use today for controlling expansion valves 30. With reference to FIG. 1, superheat can be measured across the evaporator 20 as demonstrated by sensor points 280 and 282. For the sake of simplicity, the electrical connections of these sensors to the controller 60 is omitted, but an accurate measure of superheat represented by the differential between sensor points 280 and 282 is in use today as a criteria to control an expansion valve 30. A further alternative definition of superheat is the use of the differential between the sensor 92 and the sensor point 280 to control an expansion valve 30. Other definitions of superheat are conventionally known in the industry and all such definitions are included in the definition of superheat as used herein.

What is claims as Letters Patent of the United States are:

1. A method of controlling an expansion valve in a refrigeration system, the method comprising the steps of:
   controlling the modulation of the expansion valve based upon a first feedback control criteria; and also
   controlling the modulation of the expansion valve based upon a second feed forward control criteria;
   wherein the feedback modulation of the expansion valve is based on conventional PID control and wherein the feed forward modulation of the expansion valve is based on feed forward control strategies; and
   wherein the system includes an evaporator providing chilled water where the chilled water has an entering water temperature, a leaving water temperature, and a difference Delta T in temperature between the entering water temperature and the leaving water temperature, and wherein the second criteria is a function of Delta T.

2. The method of claim 1 wherein the first criteria is a function of discharge superheat.

3. The method of claim 1 including the further step of determining the existence of a system disturbance.

4. The method of claim 3 including the further step of initiating concurrent control of the expansion valve based upon the second criteria whenever a system disturbance is determined.

5. A method of controlling an expansion valve in a refrigeration system, the method comprising the steps of:
   controlling the modulation of the expansion valve based upon a first feedback control criteria; and also
   controlling the modulation of the expansion valve based upon a second feed forward control criteria;
   wherein the feedback modulation of the expansion valve is based on conventional PID control and wherein the feed forward modulation of the expansion valve is based on feed forward control strategies; and
   wherein the system includes an evaporator providing chilled water, the chilled water having an entering water temperature and a leaving water temperature, and wherein the second criteria is a function of the difference between the entering water temperature and a setpoint.

6. A method of controlling an expansion valve comprising the steps of:
   constantly controlling an expansion valve based upon a first measured criteria;
   determining a disturbance in a second measured criteria in the system being controlled by the expansion valve;
   providing a feed forward control signal to the expansion valve based upon the second criteria; and
   controlling the expansion valve based upon the second criteria;
   wherein the feedforward control signal is modified in response to secondary variations in system disturbance such as changes in saturated evaporator temperature, saturated evaporator pressure, saturated condenser temperature or saturated condenser pressure.

7. A method of controlling an expansion valve comprising the steps of:
   constantly controlling an expansion valve based upon a first measured criteria;
   determining a disturbance in a second measured criteria in the system being controlled by the expansion valve;
   providing a feed forward control signal to the expansion valve based upon the second criteria; and
   controlling the expansion valve based upon the second criteria; and
   wherein the first criteria is either measured superheat or a measured liquid level and whether the second criteria is a measure of the temperature of a fluid being cooled by an evaporator, or a measure of the cooling capacity of the system.

8. A method of controlling an expansion valve in a refrigeration or HVAC system comprising the steps of:
   providing closed loop control of an expansion valve based upon a first criteria; and
   providing open loop control of the expansion valve based upon at least a second criteria differing from said first criteria;
   wherein the first criteria is either measured superheat or a measured liquid level and wherein the second criteria is a measure of the temperature of a fluid being cooled by an evaporator, or a measure of the cooling capacity of the system.

9. The method of claim 8 wherein the open and closed loop controls are concurrent.

10. A method of controlling the flow of refrigerant in a refrigeration system, the system including an expansion device and a compression device, the method comprising the steps of:
    measuring the capacity of the compression device;
    modulating the expansion device in response to the measured compressor capacity;
    determining a measure of superheat in the system; and
    modulating the expansion valve based upon measured superheat until a change in measured compressor capacity exceeds predefined parameters;
    wherein the measured compressor capacity is determined by making a measurement;
    wherein the refrigeration system includes an evaporator for cooling water, and an entering water temperature sensor for measuring the temperature of water entering the evaporator to be cooled, and
    wherein the measurement is indicative of the entering water temperature.

11. The method of claim 10 wherein the compression device includes a slide valve and the measurement is indicative of the slide valve's position.

12. The method of claim 11 wherein the measurement is indicative of the slide valve's commanded position.

13. The method of claim 10 wherein the evaporator includes a leaving water temperature sensor measuring the temperature of water cooled by the evaporator, and wherein the measurement is indicative of the difference between the entering water temperature and the leaving water temperature.

14. A method of controlling the capacity of a chiller system, the chiller system including a circularly linked compressor, condenser, expansion device, and an evaporator where the evaporator receives entering water having an entering water temperature and provides leaving water having a leaving water temperature and where the compressor compresses refrigerant having a measured superheat, the method comprising the steps of:

measuring a water temperature and the refrigerant superheat;

determining a water temperature error as a function of the difference between the water temperature and a setpoint;

providing a first mode of capacity control wherein the expansion valve is modulated in response to the measured superheat; and providing a second mode of capacity control where the expansion valve is modulated in response to the water temperature error.

15. The method of claim 14 including the further step of determining the water temperature error as a function of the difference between the entering water temperature and the leaving water temperature.

16. The method of claim 14 including the further step of determining the water temperature error as a function of the difference between the leaving water temperature and a setpoint.

17. The method of claim 14 including the further step of determining the water temperature error as a function of the difference between the entering water temperature and a setpoint.

18. A method of repositioning an expansion valve in a chiller system in response to changes in system capacity, the chiller system having an evaporator for conditioning entering water and providing leaving water, the method comprising the steps of:

monitoring the entering water temperature of the evaporator;

monitoring the leaving water temperature of the evaporator;

determining a water temperature difference between the entering water temperature and the leaving water temperature;

determining a temperature differential setpoint;

comparing the water temperature difference to the differential temperature setpoint to establish an error; and repositioning the expansion valve to minimize the error.

19. A water chiller system comprising an evaporator for chilling a fluid;

a compressor, receiving heated refrigerant from the evaporator, for changing the condensation temperature of the refrigerant by compression;

a condenser, receiving compressed refrigerant from the compressor, for condensing the compressed refrigerant;

an expansion device, receiving condensed refrigerant from a condenser, for controllably returning the condensed refrigerant to the evaporator;

a controller, operatively connected to the expansion device, for controlling the operation of the expansion device; and feed forward control, coupled to the controller, for anticipating changes in the load of the evaporator whereby the feed forward control includes a first sensor sensing a first value and controlling the operation of the expansion valve in response to the sensed first value, the first sensor being operably connected to the controller and measuring the temperature of the first fluid as it enters the evaporator, and wherein the entering fluid temperature is said first value.

20. The chiller system of claim 19 further including the first temperature sensor operably connected to the controller and measuring the temperature of the fluid entering the evaporator, a second temperature sensor operably connected to the controller and measuring the temperature of the fluid leaving the evaporator, and a comparator operatively associated with the controller and determining a differential between the temperatures measured by the first and second sensors whereby that differential is the first value.

21. The chiller system of claim 19 wherein the compressor includes a slide valve and a device operatively associated with the controller and determining the position of the slide valve whereby the position of the slide valve is said first value.

22. The chiller system of claim 21 further including a second sensor in association with the evaporator and operatively linked with the controller and determining the height of liquid refrigerant in the bottom of the evaporator, whereby the measured height of the liquid in the bottom of the evaporator is used as a second value for controlling the position of the expansion device.

23. The chiller system of claim 19 wherein the evaporator includes a liquid vapor separator and wherein the first sensor determines the amount of liquid refrigerant accumulating in the liquid vapor separator and provides a signal representative of that measured amount to the controller whereby the first value is the measured amount of liquid refrigerant in the liquid vapor separator.

24. The chiller system of claim 19 wherein the first sensor measures the accumulation of liquid refrigerant in the bottom of the condenser and forwards a signal representative of that accumulation to the controller whereby the measured accumulation of liquid refrigerant in the condenser is the first value.

* * * * *